United States Patent [19]

Blaese

[11] Patent Number: 5,281,970
[45] Date of Patent: Jan. 25, 1994

[54] DEVICE FOR ACCENTUATING THE RANGE OF HAND-HELD REMOTE CONTROL TRANSMITTERS

[76] Inventor: Herbert R. Blaese, 3314 Olcott Ave., Chicago, Ill. 60634

[21] Appl. No.: 548,666

[22] Filed: Jul. 5, 1990

[51] Int. Cl.⁵ .................. G08C 19/12; H01Q 1/24
[52] U.S. Cl. ..................... 341/176; 343/702; 343/878; 439/916; 455/95; 455/129
[58] Field of Search ........ 341/176; 340/539, 305-306; 455/128, 68, 70, 97, 127, 95, 129; 343/872-873, 878, 880-881, 890, 892, 906, 702; 439/916, 544, 374; 180/167; 248/206.3

[56] References Cited

U.S. PATENT DOCUMENTS

| | | | |
|---|---|---|---|
| 3,618,102 | 11/1971 | Dickason et al. | 343/906 X |
| 3,936,833 | 2/1976 | Bush | 341/176 |
| 4,104,642 | 8/1978 | Padilla et al. | 343/892 X |
| 4,138,681 | 2/1979 | Davidson et al. | 343/702 |
| 4,296,408 | 10/1981 | Neuringer | 455/95 X |
| 4,335,375 | 6/1982 | Schaeffer | 340/539 |
| 4,661,992 | 4/1987 | Garay et al. | 455/129 X |
| 4,761,823 | 8/1988 | Fier | 439/374 X |
| 4,804,969 | 2/1989 | Blaese | 343/892 X |
| 4,896,855 | 1/1990 | Furnish | 248/206.3 |
| 5,025,704 | 6/1991 | Davis | 455/95 X |
| 5,029,662 | 7/1991 | Pena | 180/167 |

FOREIGN PATENT DOCUMENTS 0348187 12/1989 European Pat. Off. ............ 343/702

Primary Examiner—John K. Peng
Assistant Examiner—Thomas J. Mullen, Jr.
Attorney, Agent, or Firm—Gerstman & Ellis, Ltd.

[57] ABSTRACT

A range accentuating device for remote control transmitters, used in connection with automobile and other types of accessories and options, is provided. The invention is comprised of an antenna, and a receptacle to couple the remote control transmitter, via mutual coupling, to the antenna. When the remote control transmitter is coupled to the antenna and the remote control transmitter is activated, the signal from the remote control transmitter is accentuated.

10 Claims, 3 Drawing Sheets

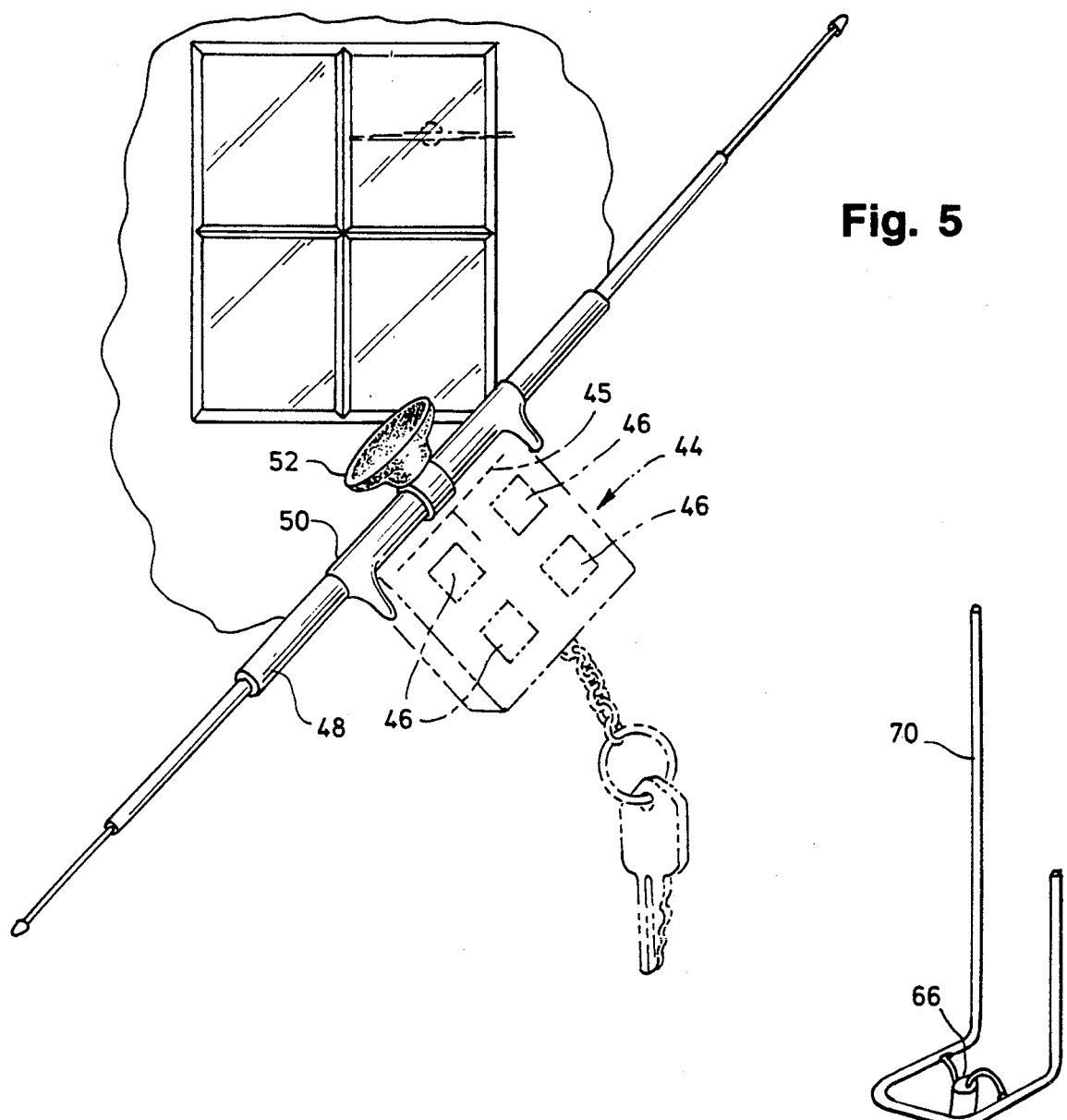
Fig. 5
Fig. 6
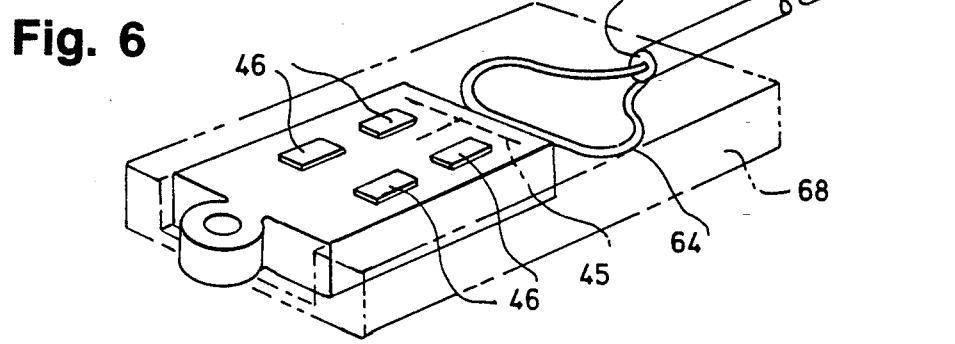

DEVICE FOR ACCENTUATING THE RANGE OF HAND-HELD REMOTE CONTROL TRANSMITTERS

FIELD OF THE INVENTION

The present invention concerns a novel device for increasing the range of remote control transmitters by mutual coupling.

BACKGROUND OF THE INVENTION

For comfort, safety and security reasons automobiles may now be equipped with devices such as alarms, power door locks, engine starters, automobile locators, etc., that can be remotely controlled. Typically, these functions must be performed within a relatively short distance from the automobile due to the limited range and power of the small remote control transmitters.

The use of a remote control transmitter enables the user to start an automobile prior to entry allowing the engine to warm up and the climate control to reach optimum. Other devices enable the user to lock and unlock a vehicle remotely and enable the user to cause the horn to sound and the lights to flash, so as to quickly find a car in a large or crowded parking lot.

The convenience of very small remote control transmitters, such as those forming a portion of a key fob, is self evident. However, due to the small size of these remote control transmitters, allowing them to fit in a pocket or purse, the power capabilities are limited. Because of this, the range at which the remote control transmitter is operable, is limited. Some manufacturers have attempted to make their receiving devices more sensitive, with the results that while little greater range is achieved, more false signals from remote operation of similar remote control transmitters are received, causing the devices to respond to other than their owner's commands.

It is, therefore, an object of the present invention to provide a means for accentuating the range of a remote control transmitter, without affecting the sensitivity of the installed devices.

Another object of the present invention is to provide a range accentuator that is easy to use, economical and simple to manufacture.

Other objects and advantages of the present invention will become apparent as the description proceeds.

SUMMARY OF THE INVENTION

In accordance with the present invention, a range accentuator for use with hand-held remote control transmitters is provided which comprises a receptacle for receiving remote control transmitters of various dimensions and an antenna. The antenna is operable to accentuate signals from the remote control transmitter when the remote control transmitter is received via mutual coupling in the receptacle and then activated.

In one illustrative embodiment, the receptacle for receiving a remote control transmitter is a base with a cavity defined within the base and a notch the size of a remote control transmitter defined on the base. An antenna is provided, located partly on the base and partly within the base, and includes a number of electrically conductive portions. The antenna includes a first antenna segment and a second antenna segment on the base. Within the base a rod of electrically conductive metal is carried having two legs, of equal length, each attached to one of the first antenna segment and the second antenna segment. The center of the rod is positioned, within the cavity, so that it is proximal to the notch in the base, and so that its legs are parallel to each other. The first and second antenna segments and the rod of electrically conductive metal effectively form a single antenna of one-half electrical wavelength. The first and second antenna segments and the metal rod can also be made as a single continuous piece of electrically conductive metal.

In that illustrative embodiment, a metal bar is provided, within the cavity and separated from the rod by bridges that support the rod, to provide stability and weight to the device and to allow for the placement of the device on metallic surfaces with no de-tuning effect.

The remote control transmitter is placed within the notch, so that the conductive rod is proximal to the emitting end of the remote control transmitter. When the remote control transmitter is activated, the antenna accentuates the signal sent to the remotely controlled device. The effect is to allow the remote control transmitter to be three or four times further away than without the range accentuator, and still cause the remotely controlled devices to activate.

In another embodiment, a sleeve is provided. The sleeve comprises a body with a bottom, a front end, two sides and a partial top, an electrically conductive bar at the front end of the body and two collapsible antenna elements pivotally attached to the sleeve. When unfolded and extended, the two antenna elements and the electrically conductive bar form an antenna. When the remote control transmitter is slid into the sleeve and the antenna elements are unfolded and extended to their open position, the sleeve acts in the same way that the base works to accentuate the range of the remote control transmitter.

In another embodiment, an antenna is provided with a collar carried thereon. The collar carries a receptacle for receiving remote control transmitters, and a suction cup for attaching the antenna and collar to a window, preferably overlooking the automobile. When a remote control transmitter is mutually coupled to the receptacle and activated, the effect is identical to the effect described above.

In one embodiment, either a coaxial or a twin lead cable is provided. The cable is connectable to the receptacle for remote control transmitters, at one end, and is connectable to an antenna, at its other end. The leads of the cable which are connected to the antenna may be moved to achieve the proper impedance match.

BRIEF DESCRIPTION OF THE DRAWINGS

FIG. 5 is a perspective view of a window version of the device of the present invention;

FIG. 6 is a perspective view of the cable extender of the present invention.

DETAILED DESCRIPTION OF THE ILLUSTRATIVE EMBODIMENT

Figure 1:
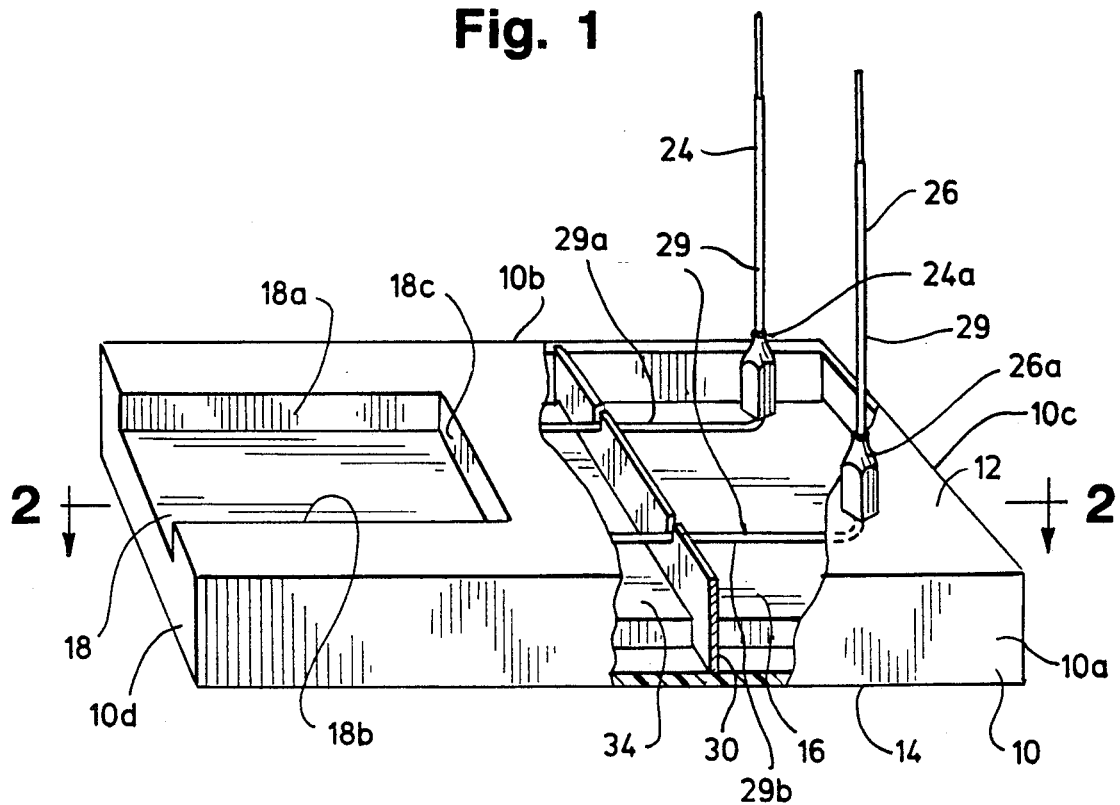
FIG. 1 is a perspective drawing of a range accentuator constructed in accordance with the principles of the present invention, with a section of the top and side cut away to allow a view of the interior cavity of the device.
Figure 2:
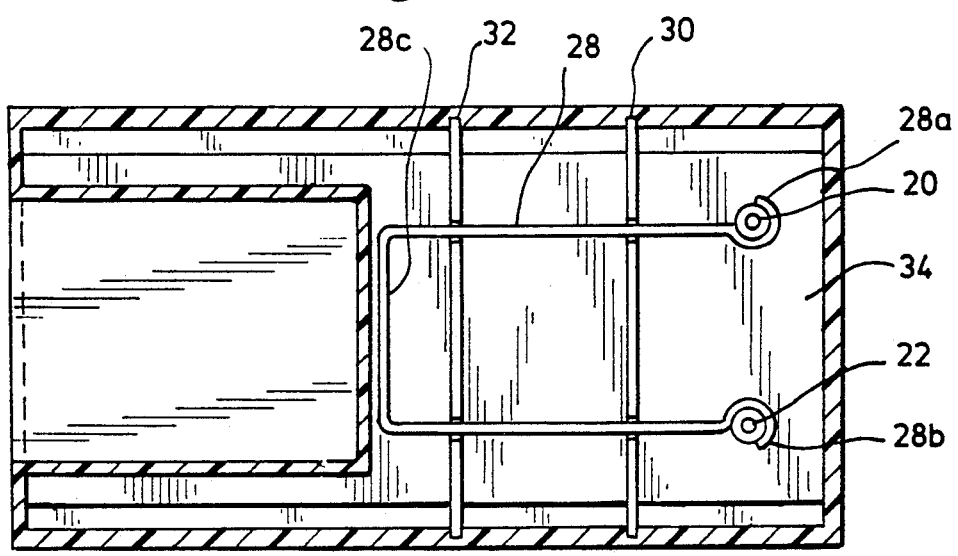
FIG. 2 is a cross-sectional view of the device of FIG. 1, taken along the plane of the line 2—2 of FIG. 1.

Referring to the drawings, FIGS. 1 and 2 shows a range accentuator comprising an electrically nonconductive base 10 having a top 12, a bottom 14, and sides 10a, 10b, 10c and 10d, forming a cavity 16 therein. A notch 18 is defined within the top 12 of the base 10; the notch 18 having sides 18a and 18b and end 18c.

Two screws 20 and 22 extend from within cavity 16 through top 12 for attachment to the base 10 of a first antenna segment 24 and a second antenna segment 26 at a first end 24a and a second end 26a.

An electrically conductive metal rod 28, having rod legs 29a, 29b, formed in the shape of a "U" with screw holding ends 28a and 28b, and center length 28c, is attached to screws 20 and 22 within the cavity 16, and is supported by bridges 30 and 32 so that the rod end 28c is proximal to notch end 18c. The first antenna segment 24, the second antenna segment 26 and the electrically conductive metal rod 28 combine to form one antenna 29, with an effective length of one-half electrical wavelength.

An electrically-insulating bar 34 is provided, resting on bottom 14 and supporting bridges 30 and 32, giving the base 10 weight, lowering its center of gravity to avoid overturning, and allowing for the placement of the base 10 on metallic surfaces without causing a detuning effect on the device of the present invention. When a remote control transmitter is inserted into notch 18, and thereafter activated, rod 28 and antennas 24 and 26 receive and accentuate the remote control transmitter's signal.

Figure 3:
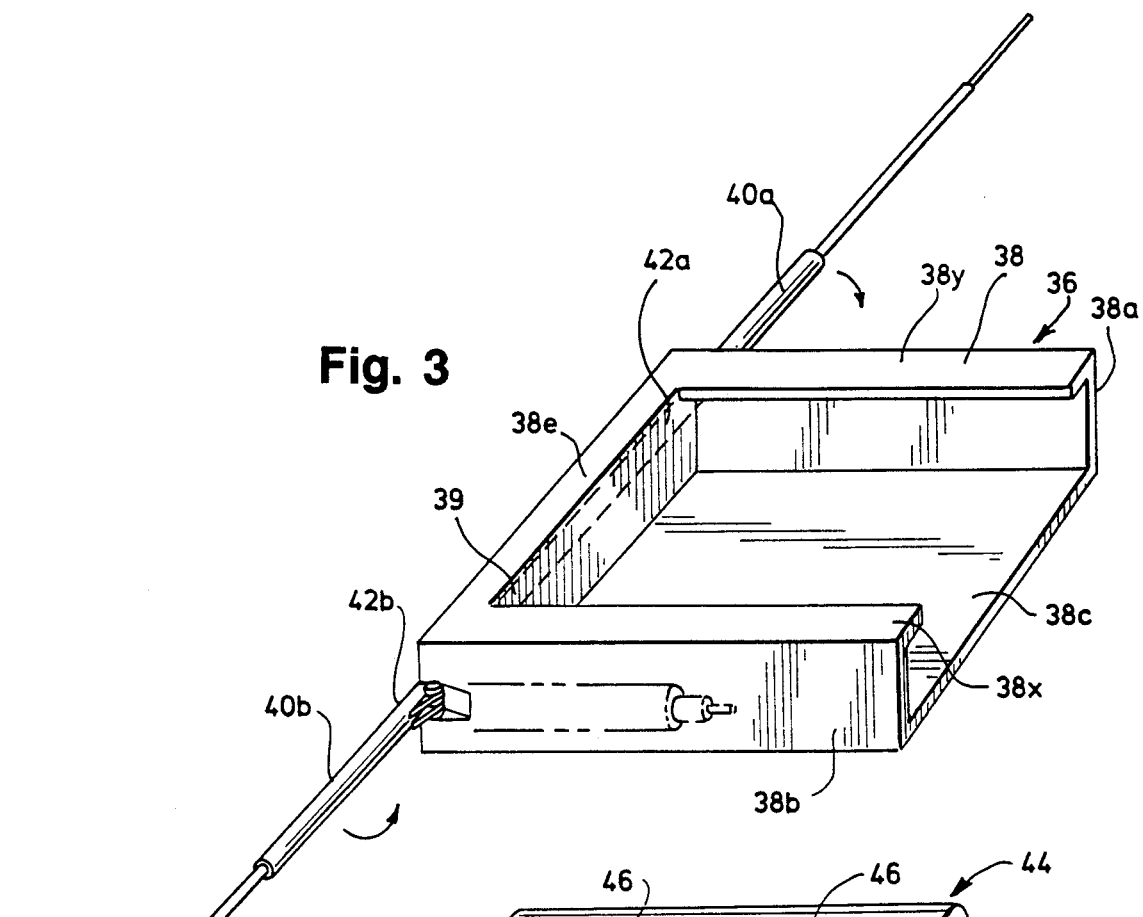
FIG. 3 is a perspective view of a portable version of the device of the present invention.
Figure 4:
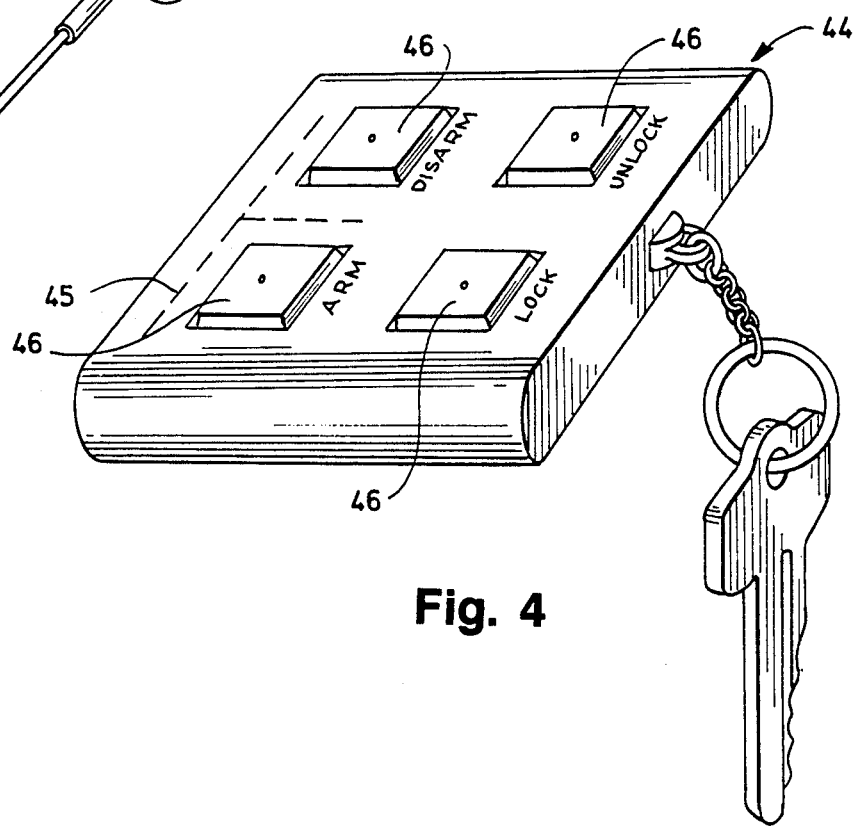
FIG. 4 is a typical remote control transmitter for use with the present invention.

In another embodiment, shown in FIG. 3, a portable range accentuator 36 is provided, comprising a sleeve 38 with two opposing sides 38a and 38b, an end 38e, a bottom 38c and a partial top 38t composed of two wings 38x and 38y. An electrically conductive bar 39 is carried on end 38e, and two collapsible antenna sections 40a and 40b, respectively, are attached by hinges 42a and 42b to sleeve 38, so that they may be folded along sides 38a and 38b, respectively, for storage. When a remote control transmitter 44, having antenna means 45, is inserted into sleeve 38, as shown in FIG. 4, and antenna sections 40a and 40b are fully extended, to their unfolded and uncollapsed positions, portable range accentuator 36 operates, upon the activation of the remote control transmitter 44, to accentuate the signal from the remote control transmitter 44.

As the remote control transmitter 44 fits below wings 38x and 38y, the sleeve 38 serves to prevent the input means 46 on the remote control transmitter 44 from being accidentally depressed while in a pocket or purse, saving battery life and wear and tear, and preventing accidental working of the remotely controlled devices.

In another embodiment, illustrated in FIG. 5, an antenna 48 of the required length is fitted with a docking collar 50 on which a suction cup 52, for attachment of the device of the present invention to a window, is carried. When the user wishes to activate a remotely controlled device, the remote control transmitter 44 is docked with the docking collar 50 and the function desired is depressed in the usual manner, with the result that the signal from the remote control transmitter 44 is accentuated.

In addition to the embodiments presented above, a coaxial cable 60, or other similar cable, is modified, at its first end 62, such that the conductors within the cable are connected together to form a loop 64, which is carried in a housing 68 similar to either the base 10 or the sleeve 38 of the above described embodiments. The cable's second end 66 is attached to an antenna 70, in FIG. 6 the antenna 70 is illustrated as a "J" type antenna. The remote control transmitter 44 is then inserted into the housing 68 and activated. The signal from the remote control transmitter 44 travels through the cable 60 to the antenna 70 which then accentuates the signal. In a "J" type antenna 70, the antenna may be tuned to the correct frequency of the remotely controlled device by sliding both leads of the cable 60 along a portion of the "J" type antenna 70.

The present invention allows the utilization of any of the functions, remotely available through a remote control transmitter 44 and a receiver, on a remotely controlled device, from a greater distance than would be possible without the present invention. The user of a remotely controlled device merely places the remote control transmitter 44 in the present invention, by either slipping the remote control transmitter 44 into a docking collar 50, a portable sleeve 38 or a desk top base 10; the remote control transmitter 44 is then used as usual. The present invention receivers the signal from the remote control transmitter 44 via mutual coupling, accentuates it, and then emits the accentuated signal. The signal is thus able to travel a greater distance, with enough potential to activate the remotely controlled devices in the automobile. The sensitivity of the installed remotely controlled devices need not be changed, and, therefore, the installed remotely controlled devices are unaffected by stray remote control transmitter 44 signals.

Thus, a car can be started from the comfort of home, while sitting at home. The engine can thereby be operating at optimum running temperature, particularly important in diesel engine cars, and depending on how the car's climate control switches were left, the car can be cool for summer driving or heated for winter use. Alarms can also be armed and disarmed from similar distances. If the alarm is sounded, due to a break in, the alarm can subsequently by disarmed quickly while the police are summoned.

Power door locks attached to a remotely controlled device can lock and unlock a car from a distance. This enables the user to lock the doors from a distance without necessitating the return to the car. Also, doors can be locked for the evening without returning to the car. Car doors can be unlocked from a distance so as to enable quick entrance due to inclement weather or other threats to safety.

Although illustrative embodiments of the invention have been shown and described, it is to be understood that various other modifications and substitutions may be made by those skilled in the art without departing from the novel spirit and scope of the invention.

What is claimed is:

1. A range accentuator for use with hand-held remote control transmitters comprising:
   a base;
   said base having means for receiving a remote control transmitter via mutual coupling;
   a first antenna extending from said base;
   a second antenna extending from said base, one-half of a pre-defined wave length longer than said first antenna; and
   an electrically conductive rod, carried by said base, having one end attached to said first antenna and a second end attached to said second antenna, such that when said remote control transmitter is received by said base and activated said rod receives a signal and accentuates said signal via said antennas.

2. The range accentuating device of claim 1, wherein a cavity is defined within said base and a plate is placed within said cavity to provide stability and prevent detuning of said antennas by exterior metal surfaces.

3. The range accentuating device of claim 1, wherein a notch is defined on said base enabling the placement of said remote control transmitter on said base.

4. The range accentuating device of claim 1, wherein said antennas are parallel to each other.

5. The range accentuating device of claim 1, wherein the legs of said rod are parallel to each other.

6. The range accentuating device of claim 1 wherein said rod and said antennas are one unit.

7. A range accentuating device for use with a hand-held remote control transmitter comprising:
   a sleeve for receiving said remote control transmitter via mutual coupling; and
   an electrically conductive bar carried by said sleeve, so that when a remote control transmitter is placed within said sleeve and said remote control transmitter is activated said bar receives a signal and accentuates said signal;
   said electrically conductive bar comprising a central bar and two collapsible antenna ends pivotally attached to said sleeve proximal to each end of said bar, such that when said antenna ends are unfolded and extended said antenna ends and said bar combine to form an antenna.

8. A range accentuating device for use with a hand-held remote control transmitter comprising:
   a receptacle for holding said hand-held remote control transmitter via mutual coupling;
   conducting means, having a first conductor and a second conductor and a first end and a second end, said first end formed as a loop by connecting said conductors to each other at said first end, said loop carried by said receptacle;
   an antenna; and
   attaching means for connecting said second end of said conducting means to said antenna so that when said remote control transmitter is placed within said receptacle and thereafter activated said antenna receives a transmission and accentuates said transmission.

9. The range accentuating device of claim 8 wherein said conducting means is a coaxial cable.

10. The range accentuating device of claim 8 wherein said conducting means is a twin lead cable.

* * * * *